(12) United States Patent
Williamson et al.

(10) Patent No.: US 8,866,634 B2
(45) Date of Patent: Oct. 21, 2014

(54) SYSTEM AND METHOD FOR REMOTELY MONITORING AND CONTROLLING A WATER METER

(75) Inventors: Walter Scott Williamson, Flower Mound, TX (US); James Scott Williamson, Flower Mound, TX (US); Jack Ryan Williamson, Flower Mound, TX (US)

(73) Assignee: Capstone Metering LLC, Flower Mound, TX (US)

( * ) Notice: Subject to any disclaimer, the term of this patent is extended or adjusted under 35 U.S.C. 154(b) by 1347 days.

(21) Appl. No.: 12/299,493

(22) PCT Filed: May 4, 2007

(86) PCT No.: PCT/US2007/068242
§ 371 (c)(1),
(2), (4) Date: Mar. 24, 2009

(87) PCT Pub. No.: WO2007/131169
PCT Pub. Date: Nov. 15, 2007

(65) Prior Publication Data
US 2009/0309755 A1    Dec. 17, 2009

Related U.S. Application Data

(60) Provisional application No. 60/797,540, filed on May 4, 2006.

(51) Int. Cl.
G08B 23/00 (2006.01)
G01D 18/00 (2006.01)
G01D 4/00 (2006.01)
G01F 15/06 (2006.01)
G01F 25/00 (2006.01)

(52) U.S. Cl.
CPC ............ *G01F 15/063* (2013.01); *G01D 18/006* (2013.01); *Y04S 20/322* (2013.01); *G01D 4/006* (2013.01); *Y02B 90/242* (2013.01); *Y04S 20/42* (2013.01); *Y02B 90/243* (2013.01); *Y02B 90/246* (2013.01); *Y04S 20/325* (2013.01); *Y02B 90/245* (2013.01); *Y04S 20/40* (2013.01); *G01D 4/004* (2013.01); *G01F 25/0007* (2013.01)
USPC ....... 340/870.02; 702/100; 705/412; 73/1.34; 73/861.78

(58) Field of Classification Search
USPC ................ 340/870.02–870.03; 702/100, 282; 705/412; 73/1.34, 861.78
See application file for complete search history.

(56) References Cited

U.S. PATENT DOCUMENTS 3,795,144 A    3/1974 Marchesi
4,050,301 A    9/1977 Cushing
(Continued)

FOREIGN PATENT DOCUMENTS

EP        1858144 A3    1/2011
WO    WO 01/07783    2/2001

OTHER PUBLICATIONS

International Search Report for PCT/GB 00/02831 mailed Jun. 1, 2000.

*Primary Examiner* — Albert Wong
(74) *Attorney, Agent, or Firm* — Winstead PC (57) ABSTRACT

A meter that monitors usage of a water distribution system by a client is provided. The meter includes a wireless communications system operable to communicatively couple the meter to a wireless network to provide two-way communication between the meter and the wireless network; a calibration system operable to calibrate the meter, wherein the calibration system may calibrate the meter in response to an instruction received via the wireless network; and a power system operable to maintain a sufficient level of power for the meter to allow substantially real-time communication between the meter and the wireless network.

22 Claims, 3 Drawing Sheets

(56) References Cited

U.S. PATENT DOCUMENTS

| | | | |
|---|---|---|---|
| 4,237,454 | A | 12/1980 | Meyer |
| 4,253,341 | A | 3/1981 | Ikeda et al. |
| 4,258,568 | A | 3/1981 | Boetes et al. |
| 4,474,049 | A * | 10/1984 | Hansen et al. ............... 73/1.34 |
| 4,695,052 | A | 9/1987 | Berkhof |
| 4,940,976 | A | 7/1990 | Gastouniotis et al. |
| 4,945,754 | A | 8/1990 | Wissman, Jr. et al. |
| 5,056,107 | A | 10/1991 | Johnson et al. |
| 5,187,989 | A | 2/1993 | Bulteau |
| 5,199,307 | A * | 4/1993 | Onoda et al. ............... 73/861.78 |
| 5,251,480 | A | 10/1993 | Brunson, IV et al. |
| 5,261,275 | A | 11/1993 | Davis |
| 5,369,365 | A | 11/1994 | Waitman |
| 5,434,911 | A | 7/1995 | Gray et al. |
| 5,438,329 | A | 8/1995 | Gastouniotis et al. |
| 5,451,938 | A | 9/1995 | Brennan, Jr. |
| 5,481,259 | A | 1/1996 | Bane |
| 5,493,287 | A | 2/1996 | Bane |
| 5,548,990 | A * | 8/1996 | Northedge ............... 73/1.34 |
| 5,553,094 | A | 9/1996 | Johnson et al. |
| 5,574,229 | A | 11/1996 | Castillo |
| 5,594,740 | A | 1/1997 | LaDue |
| 5,597,963 | A | 1/1997 | Smart et al. |
| 5,659,300 | A | 8/1997 | Dresselhuys et al. |
| 5,689,540 | A | 11/1997 | Stephenson et al. |
| 5,714,931 | A | 2/1998 | Petite et al. |
| 5,748,104 | A | 5/1998 | Argyroudis et al. |
| 5,751,797 | A | 5/1998 | Saadeh |
| 5,801,643 | A | 9/1998 | Williams et al. |
| 5,815,086 | A | 9/1998 | Ivie et al. |
| 5,907,491 | A | 5/1999 | Canada et al. |
| 5,926,103 | A | 7/1999 | Petite |
| 5,926,531 | A | 7/1999 | Petite |
| 5,963,146 | A | 10/1999 | Johnson et al. |
| 6,028,522 | A | 2/2000 | Petite |
| 6,044,062 | A | 3/2000 | Brownrigg et al. |
| 6,058,374 | A | 5/2000 | Guthrie et al. |
| 6,060,994 | A | 5/2000 | Chen |
| 6,079,263 | A | 6/2000 | Beddies |
| 6,082,169 | A | 7/2000 | Bach |
| 6,163,276 | A | 12/2000 | Irving et al. |
| 6,172,616 | B1 | 1/2001 | Johnson et al. |
| 6,191,687 | B1 | 2/2001 | Dlugos et al. |
| 6,195,018 | B1 | 2/2001 | Ragle et al. |
| 6,218,953 | B1 | 4/2001 | Petite |
| 6,233,327 | B1 | 5/2001 | Petite |
| 6,246,677 | B1 | 6/2001 | Nap et al. |
| 6,249,516 | B1 | 6/2001 | Brownrigg et al. |
| 6,288,641 | B1 | 9/2001 | Casais |
| 6,333,975 | B1 | 12/2001 | Brunn et al. |
| 6,351,223 | B1 | 2/2002 | DeWeerd et al. |
| 6,373,399 | B1 | 4/2002 | Johnson et al. |
| 6,424,270 | B1 | 7/2002 | Ali |
| 6,430,268 | B1 | 8/2002 | Petite |
| 6,437,692 | B1 | 8/2002 | Petite et al. |
| 6,493,377 | B2 | 12/2002 | Schilling et al. |
| 6,508,116 | B1 | 1/2003 | Adachi et al. |
| 6,512,463 | B1 | 1/2003 | Campbell et al. |
| 6,560,543 | B2 | 5/2003 | Wolfe et al. |
| 6,612,188 | B2 | 9/2003 | Hamilton |
| 6,618,578 | B1 | 9/2003 | Petite |
| 6,618,680 | B2 | 9/2003 | Ross et al. |
| 6,624,750 | B1 | 9/2003 | Marman et al. |
| 6,626,048 | B1 * | 9/2003 | Dam Es et al. ............ 73/861.13 |
| 6,628,764 | B1 | 9/2003 | Petite |
| 6,633,781 | B1 | 10/2003 | Lee et al. |
| 6,650,543 | B2 | 11/2003 | Lai et al. |
| 6,653,945 | B2 | 11/2003 | Johnson et al. |
| 6,657,552 | B2 | 12/2003 | Belski et al. |
| 6,677,861 | B1 | 1/2004 | Henry et al. |
| 6,747,557 | B1 | 6/2004 | Petite et al. |
| 6,778,099 | B1 | 8/2004 | Meyer et al. |
| 6,836,737 | B2 | 12/2004 | Petite et al. |
| 6,891,838 | B1 | 5/2005 | Petite et al. |
| 6,914,533 | B2 | 7/2005 | Petite |
| 6,914,893 | B2 | 7/2005 | Petite |
| 6,931,445 | B2 | 8/2005 | Davis |
| 6,945,122 | B2 | 9/2005 | Foss et al. |
| 6,947,854 | B2 | 9/2005 | Swarztrauber et al. |
| 6,954,701 | B2 | 10/2005 | Wolfe |
| 6,980,079 | B1 | 12/2005 | Shintani et al. |
| 7,009,530 | B2 | 3/2006 | Zigdon et al. |
| 7,012,546 | B1 | 3/2006 | Zigdon et al. |
| 7,053,767 | B2 | 5/2006 | Petite et al. |
| 7,054,271 | B2 | 5/2006 | Brownrigg et al. |
| 7,072,945 | B1 | 7/2006 | Nieminen et al. |
| 7,079,810 | B2 | 7/2006 | Petite et al. |
| 7,083,158 | B1 | 8/2006 | Burt et al. |
| 7,088,239 | B2 | 8/2006 | Basinger et al. |
| 7,089,125 | B2 | 8/2006 | Sonderegger |
| 7,103,511 | B2 | 9/2006 | Petite |
| 7,117,051 | B2 | 10/2006 | Landry et al. |
| 7,124,184 | B2 | 10/2006 | Chung et al. |
| 7,137,550 | B1 | 11/2006 | Petite |
| 7,142,107 | B2 | 11/2006 | Kates |
| 7,256,704 | B2 | 8/2007 | Yoon et al. |
| 7,263,073 | B2 | 8/2007 | Petite et al. |
| 7,295,128 | B2 | 11/2007 | Petite |
| 7,301,456 | B2 | 11/2007 | Han |
| 7,353,280 | B2 | 4/2008 | Chiles et al. |
| 7,356,614 | B2 | 4/2008 | Kim et al. |
| 7,363,031 | B1 | 4/2008 | Aisa |
| 7,397,907 | B2 | 7/2008 | Petite |
| 7,417,557 | B2 | 8/2008 | Osterloh et al. |
| 7,424,527 | B2 | 9/2008 | Petite |
| 7,443,313 | B2 | 10/2008 | Davis et al. |
| 7,444,401 | B1 | 10/2008 | Keyghobad et al. |
| 7,453,373 | B2 | 11/2008 | Cumeralto et al. |
| 7,468,661 | B2 | 12/2008 | Petite et al. |
| 7,480,501 | B2 | 1/2009 | Petite |
| 7,526,539 | B1 | 4/2009 | Hsu |
| 7,650,425 | B2 | 1/2010 | Davis et al. |
| 7,697,492 | B2 | 4/2010 | Petite |
| 7,739,378 | B2 | 6/2010 | Petite |
| 7,752,309 | B2 | 7/2010 | Keyghobad et al. |
| 7,756,086 | B2 | 7/2010 | Petite et al. |
| 7,783,738 | B2 | 8/2010 | Keyghobad et al. |
| 7,792,946 | B2 | 9/2010 | Keyghobad et al. |
| 7,880,641 | B2 * | 2/2011 | Parris et al. ............ 340/870.02 |
| 2001/0048030 | A1 | 12/2001 | Sharood et al. |
| 2002/0013679 | A1 | 1/2002 | Petite |
| 2002/0031101 | A1 | 3/2002 | Petite et al. |
| 2002/0062392 | A1 | 5/2002 | Nishikawa et al. |
| 2002/0067717 | A1 | 6/2002 | Raschke et al. |
| 2002/0073183 | A1 | 6/2002 | Yoon et al. |
| 2002/0083778 | A1 | 7/2002 | Hamilton |
| 2002/0190956 | A1 | 12/2002 | Klein et al. |
| 2003/0009515 | A1 | 1/2003 | Lee et al. |
| 2003/0018733 | A1 | 1/2003 | Yoon et al. |
| 2003/0018776 | A1 | 1/2003 | Yoon et al. |
| 2003/0036810 | A1 | 2/2003 | Petite |
| 2003/0046377 | A1 | 3/2003 | Daum et al. |
| 2003/0074109 | A1 | 4/2003 | Jeong et al. |
| 2004/0010561 | A1 | 1/2004 | Kim et al. |
| 2004/0054747 | A1 | 3/2004 | Breh et al. |
| 2004/0139210 | A1 | 7/2004 | Lee et al. |
| 2004/0158333 | A1 | 8/2004 | Ha et al. |
| 2004/0183687 | A1 | 9/2004 | Petite et al. |
| 2005/0096753 | A1 | 5/2005 | Arling et al. |
| 2005/0159823 | A1 | 7/2005 | Hayes et al. |
| 2005/0195768 | A1 | 9/2005 | Petite et al. |
| 2005/0195775 | A1 | 9/2005 | Petite et al. |
| 2005/0201397 | A1 | 9/2005 | Petite |
| 2005/0203647 | A1 | 9/2005 | Landry et al. |
| 2006/0041655 | A1 | 2/2006 | Holloway et al. |
| 2006/0098576 | A1 | 5/2006 | Brownrigg et al. |
| 2008/0143109 | A1 | 6/2008 | Pitchford et al. |
| 2008/0186898 | A1 | 8/2008 | Petite |
| 2008/0284174 | A1 | 11/2008 | Nagler |
| 2008/0295895 | A1 | 12/2008 | Vincent et al. |
| 2009/0068947 | A1 | 3/2009 | Petite |
| 2009/0215424 | A1 | 8/2009 | Petite |
| 2009/0243840 | A1 | 10/2009 | Petite et al. |
| 2010/0017465 | A1 | 1/2010 | Brownrigg et al. |

(56) References Cited

U.S. PATENT DOCUMENTS

| | | |
|---|---|---|
| 2010/0039984 A1 | 2/2010 | Brownrigg |
| 2010/0194582 A1 | 8/2010 | Petite |
| 2010/0250054 A1 | 9/2010 | Petite |
| 2010/0265909 A1 | 10/2010 | Petite et al. |
| 2010/0312881 A1 | 12/2010 | Davis et al. |

* cited by examiner

SYSTEM AND METHOD FOR REMOTELY MONITORING AND CONTROLLING A WATER METER

RELATED APPLICATIONS

This application claims the benefit of U.S. Provisional Patent Application No. 60/797,540 filed May 4, 2006.

FIELD OF THE INVENTION

The present invention relates in general to measuring meters, and, more specifically, to remotely managing usage of a water distribution system.

BACKGROUND

To the extent that conventional utility meters can transmit usage data, these meters are typically capable of transmitting data only relatively infrequently due to power constraints. Moreover, this transmission distance is generally limited, requiring field technicians to either read the meter directly or from a relatively short distance away. Furthermore, conventional utility meters do not allow for rapid and tailored response to emergency situations that may require an immediate shut-off of a utility to a selected customer or group of customers.

In addition, although water meters generally require recalibration after about 3-5 years of operation, it is typical for many water meters to remain uncalibrated due to the effort and expense required to systematically check and calibrate individual meters in a given service area. As a result, the utility company or the customer may suffer significant losses due to undercharging or overcharging. Another disadvantage of conventional meters is that the meters typically must be completely disconnected or removed before repairs, part replacements, or upgrades may be performed.

Accordingly, there is a need for a water meter and system that provides real-time access to usage data, two-way communication over a significant distance, and remote calibration and control functions.

SUMMARY OF THE INVENTION

In view of the foregoing and other considerations, the present invention relates to a system and method for remotely managing and monitoring the usage and distribution of water utilities.

Accordingly, a meter that monitors usage of a water distribution system by a client is provided. The meter includes a wireless communications system operable to communicatively couple the meter to a wireless network to provide two-way communication between the meter and the wireless network; a calibration system operable to calibrate the meter, wherein the calibration system may calibrate the meter in response to an instruction received from the wireless network; and a power system operable to maintain a sufficient level of power for the meter to allow substantially real-time communication between the meter and the wireless network.

A system for managing client water usage is provided. The system includes a network operations center comprising a server, a database, and a wireless communications transmitter and receiver operable to communicatively couple the network operations center to a wireless network; and a self-powered water meter operable to monitor the client water usage, wherein the meter is communicatively coupled to the wireless network and operable to provide two-way communication with the network operations center, and wherein the meter is operable to transmit data concerning the client water usage to the network operations center.

A method for remotely managing client water usage in connection with a water distribution system, wherein the client is located within a service region, is provided. The method includes the steps of providing a self-powered wireless water meter communicatively coupled to a wireless network and operable to monitor client water usage; transmitting a request to the meter for data concerning the client water usage via the wireless network; and receiving data concerning the client water usage of the client via the wireless network.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following description of a specific embodiment of the invention, when read in conjunction with the accompanying drawings, wherein.

DETAILED DESCRIPTION

Refer now to the drawings wherein depicted elements are not necessarily shown to scale and wherein like or similar elements are designated by the same reference numeral through the several views.

The present invention is directed towards a wireless water meter and a system and method for remotely managing and monitoring usage of a water distribution system implementing the wireless water meter. The wireless water meter of the present invention may be substantially self-powered and is operable to maintain two-way communication over a wireless network with a network operations center to provide real-time access to water usage data, and remote monitoring and control of the wireless water meter.

Figure 1:
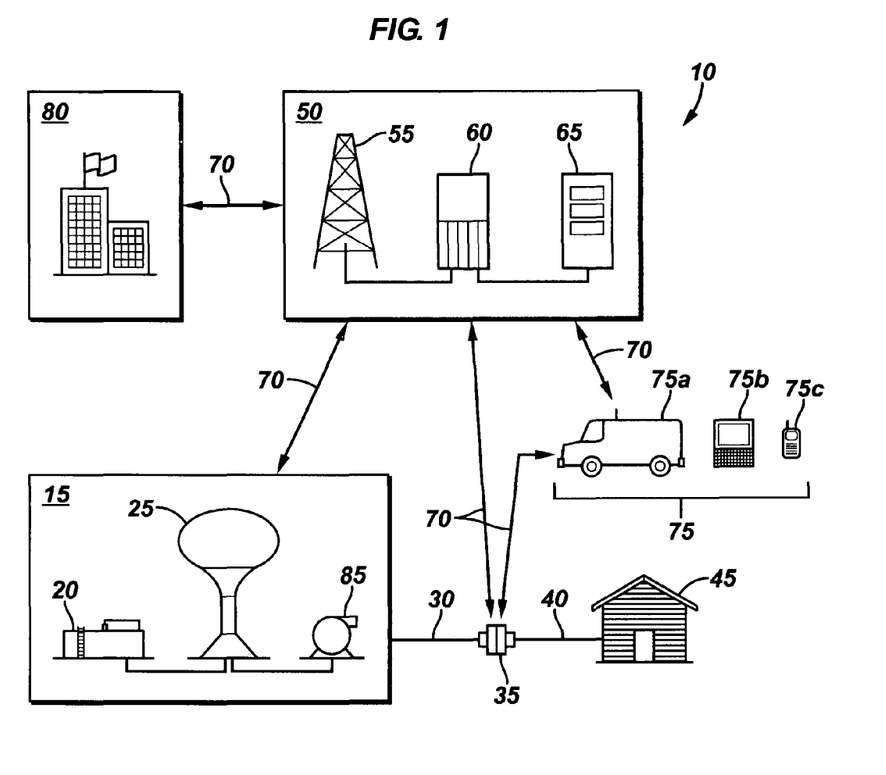
FIG. 1 is an embodiment of the system for managing water distribution of the present invention.

FIG. 1 shows the system for water distribution management of the present invention, indicated generally at 10. System 10 includes water utility grid 15 for the distribution of water to clients 45, e.g., households and businesses within a service area. Water utility grid 15 may include water treatment plants 20, water storage 25, pumping station 85 and other facilities suitable for receiving, treating, storing and distributing water throughout the service area. Water utility grid 15 distributes water to client 45 via utility line 30 and client line 40.

System 10 includes a wireless water meter 35 of the present invention. Wireless water meter 35 comprises a valve (not shown in FIG. 1) or similar device to regulate water flow to client 45 from utility line 30. Wireless water meter 35 is operable to determine the water usage of client 45 and control valve functions to shut water off or turn water on for client 45. System 10 includes wireless network 70. Wireless water meter 35 may send and receive data via wireless network 70.

Wireless network 70 may be any public, private or proprietary network, for instance. Wireless network 70 may include, for example, cellular, Wi-Fi, Wi-Max, 400 MHz, 900 MHz, proprietary radio network protocols, or any other type of wireless communications protocol.

System 10 includes network operations center 50 to manage and monitor the distribution of water utilities in system 10. Network operations center 50 may be operated by a water utility company, for example. Network operations center 50 includes a wireless communications transmitter/receiver 55 to send and receive data over wireless network 70. Network operations center 50 includes one or more servers 60 to manage data transmission through system 10. For example, transmitter/receiver 55 may receive radio frequency (RF) signals via wireless network 70 and convert these signals to Internet Protocol (IP) signals, or other suitable network protocol, for transmission to server 60, or other components of system 10. Network operations center 50 may also include database 65 to store data concerning client water usage and service area water usage, among other information.

Network operations center 50 may receive data from wireless water meter 35 concerning the water usage of client 45. Moreover, network operations center 50 may send data or instructions to wireless water meter 35. System 10 may include one or more mobile field technicians 75 to facilitate data collection and transmission throughout the service area associated with system 10. For example, network operations center 50 may send data to and receive data from wireless water meter 35 via mobile field technician 75. Mobile field technicians 75 may include transmitter/receivers 75*a*, portable computers 75*b*, and cell phones or personal digital assistants (PDA) 75*c*, for example, to communicate with wireless water meter 35 and wireless network 70.

System 10 may also allow communication with client 45 concerning the status or usage of the water utility. For example, network operations center 50 may transmit e-mail correspondence to client 45 regarding alerts or notices. For example, if network operations center 50 receives data indicating a potential water leak, network operations center 50 may request that client 45 verify whether a water leak has been observed. If the service area is subject to water rationing or similar form of controlled distribution, for instance, network operations center 50 may provide a notice to client 45 concerning the remaining amount of water client 45 is allowed to use for a given rationing period.

System 10 may include one or more emergency response centers 80. Emergency response center 80 may be any city, state or federal government agency responsible for responding to emergencies and with authority to redirect or shut off utilities based on the circumstances, e.g., natural disasters or contamination, for example. For example, emergency response center 80 may include local fire departments, the Federal Emergency Management Agency (FEMA), the United States Department of Homeland Security (DHS), or similar entities. Network operations center 50 may communicate with emergency response center 80, via wireless network 70, for example, and manage the distribution of utilities throughout system 10 in accordance with instructions received from emergency response center 80.

Figure 2:
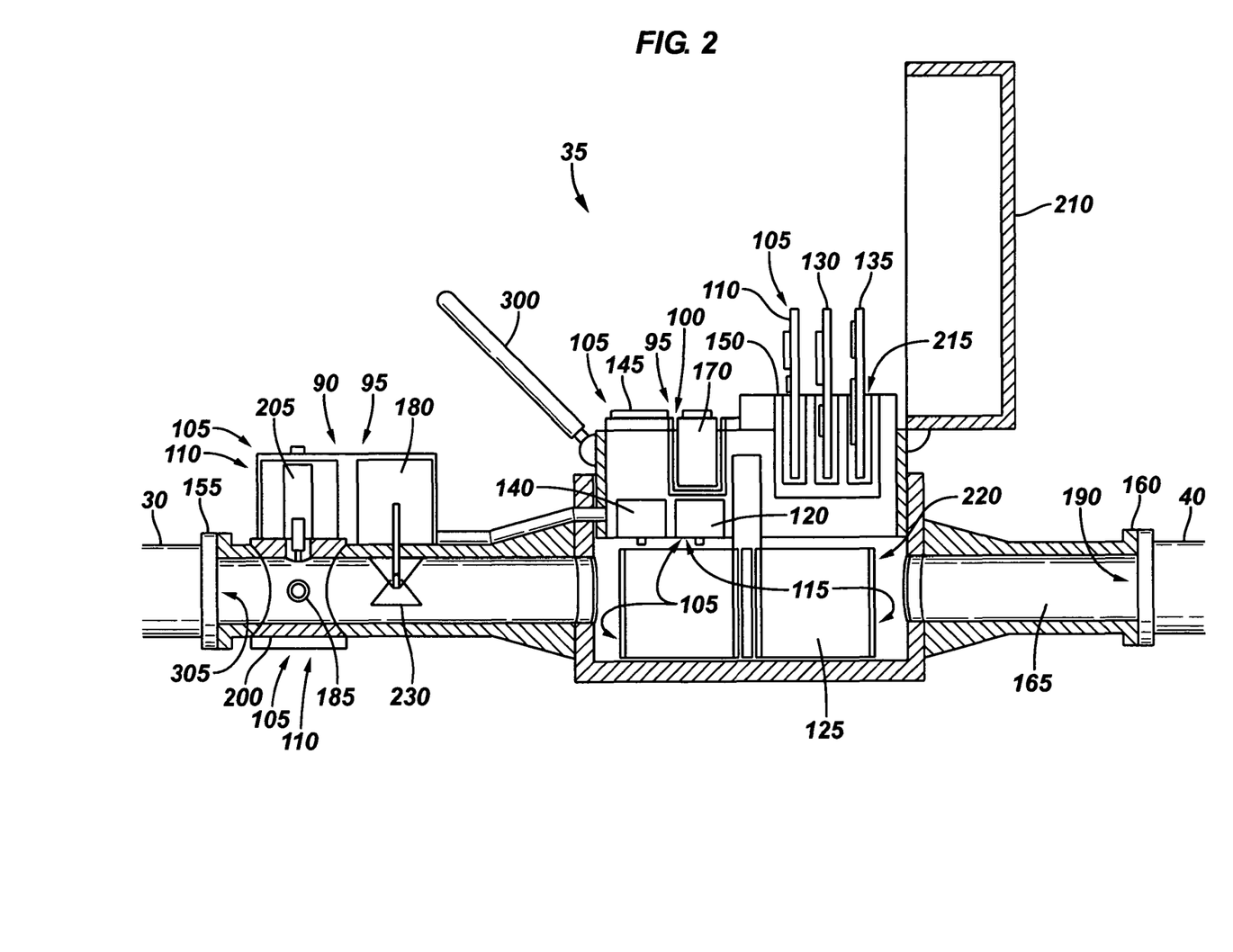
FIG. 2 is a partial cross-section side view of an embodiment of the wireless water meter of the present invention.

FIG. 2 is a cross-section view of an embodiment of wireless water meter 35. Wireless water meter 35 includes utility line connection 155 and client line connection 160 to provide connections with utility line 30 and client line 40, respectively. Wireless water meter 35 comprises entry port 305, client port 190, and interior channel 165 of a selected diameter to allow water flow between utility line 30 and client line 40 to client 45. Wireless water meter 35 includes calibration or test port 185 of selected diameter, e.g., ⅛ inch, to allow for calibration and testing. Calibration port 185 may be positioned within any suitable location in wireless water meter 35 and may be incorporated in valve 200, as shown in FIG. 2, for example. Wireless water meter 35 may include one or more expansion card slots 215 to connect components to wireless water meter 35 and facilitate replacement and upgrades of these components, e.g., wireless communication module 130 or electronic systems module 150.

Wireless water meter 35 may include display 145, such as an LCD readout for example, to display information and water usage data, for instance. Display 145 may be connected to electronic systems module 150 to provide both local and remote field meter readings and measurements to field technicians 75 or network operations center 50 (both not shown in FIG. 2). Wireless water meter 35 may also include sealing lid 210 (shown in an open position in FIG. 2) to provide a sealed compartment for the electronic components of meter 35. As shown in the embodiment depicted in FIG. 2, wireless water meter 35 includes charging system 90, power system 95, battery system 100, calibration system 105, meter shut-off system 110, flow measurement system 115, wireless communications module 130, and electronic systems module 150, among other components.

Power system 95 provides sufficient power to wireless water meter 35 to permit substantially real-time access to wireless water meter 35 over wireless network 70 and permit wireless water meter 35 to perform actions such as transmitting data and self-calibrating as needed and on a fairly regular basis. As shown in the embodiment in FIG. 2, power system 95 may include battery system 100 and charging system 90 to provide a substantially self-powered meter 35. Wireless water meter 35 may also include auxiliary power sources, such as solar panels, for example, or connections to external charging devices or power sources.

Battery system 100 provides power for wireless water meter 35. As shown in FIG. 2, battery system 100 include one or more batteries 170. Battery 170 is preferably a rechargeable polymer lithium battery or similar compact and lightweight battery with sufficient energy density. For example, each cell of a polymer lithium battery 170 may provide 3.7 V at 2000 mAh (milli-Amperes/hour). A suitable battery 170 may include the Ultralife Polymer® Lithium or Ultralife Polymer® Lithium ION battery manufactured by Ultralife Batteries, Inc. of Newark, N.Y., for example.

Charging system 90 provides charge current to battery system 100 to put a selected amount of energy into the cells of battery 170. For example, for the polymer lithium batteries discussed above, charging system 90 may provide a 4 to 12 V DC current. Charging system 90 may include a miniature hydroelectric turbine AC or DC alternator or generator 180. Generator 180 may utilize the water flow within wireless water meter 35, e.g., water flow through interior channel 165 rotates generator paddle 230 to generate power. A suitable hydroelectric turbine AC/DC alternator/generator is manufactured by Graupner GmbH & Co. KG of Germany, for example. Accordingly, charging system 90 provides a built-in battery charging system for providing power to maintain the on-board battery, electronic components and network communications. As a result, wireless water meter 35 may be substantially self-powered and may generate enough power to provide substantially real time access and communications capability over wireless network 70 for greater periods of time and also perform actions such as calibrating itself without being constrained by power limitations. In addition, the components of power system 95 are modular, and allow a user to replace components, e.g., battery 170, quickly and easily, and without necessitating the removal of the entire meter 35. Wireless water meter 35 may use other devices to maintain a constant power source, including solar panels, for example.

Flow measurement system 115 measures water flow volume through wireless water meter 35 to allow for a determination of the water usage by client 45 (not shown in FIG. 2). Flow measurement system 115 may include any mechanical device, electronic device, or combination thereof, suitable for measuring water flow volume. For example, as shown in FIG. 2, flow measurement system 115 includes optic sensor 120 and paddle wheel 125, the latter positioned within water chamber 220. The flow of water through interior channel 165 and water chamber 220 rotates paddle wheel 125. Optic sensor 120 determines the number of times paddle wheel 125 rotates for a selected amount of time to allow for a determination of water flow volume. Other types of sensors 120 may be used, including proximity sensors or Hall effect sensors, for example. Flow measurement system 115 may then transmit the flow volume measurement data to electronic systems module 150. The flow volume measurement data may also be displayed via display 145.

Meter shut-off system 110 allows wireless water meter 35 to shut-off water to client 45 (not shown in FIG. 2). Meter shut-off system 110 includes valve 200 that may be selectively opened and closed to permit or restrict water flow through wireless water meter 35. Valve 200 may be a low voltage ball valve or a low voltage solenoid valve, for example. Network operations center 50 may remotely operate wireless water meter 35 and meter shut-off system 110 via wireless network 70 to remotely shut-off water to client 45 (collectively not shown in FIG. 2). For example, meter shut-off system 110 may comprise a power saving push-lock push-unlock solenoid 205 to control the operation of valve 200. Power saving push-lock push-unlock solenoid 205 typically uses power only during activation to open or close valve 200 using a spring to hold the locking mechanism in place.

Wireless water meter 35 includes primary wireless communications module 130, which may be communicatively coupled to wireless water meter 35 via an expansion card slot 215. Primary wireless communications module 130 may comprise any module operable to support two-way communication over a wireless network. For example, primary wireless communications module 130 may include a plug-in radio communications card to support cellular, Wi-Fi, Wi-Max, 400 MHz, 900 MHz or proprietary radio network protocols, among other wireless protocols. Wireless water meter 35 may also include backup wireless communications module 135 in the event that primary wireless communications module 130 becomes inoperable or the communications network for primary wireless communications module 130 goes down. Backup wireless communications module 135 preferably uses a different communications protocol than module 130, e.g., communicates via a different network, to provide greater reliability or emergency response. Wireless water meter 35 may include additional expansion card slots 215 to allow for additional wireless communications modules 130 or electronic systems modules 150. Wireless water meter 35 may include an antenna 300, e.g., connected to electronic systems module 150 or communications modules 130 or 135, for example, to facilitate wireless communication.

Electronic systems module 150 comprises a circuit board or similar electronic device comprising a microprocessor, memory and similar components. Electronic systems module 150 includes firmware-based programs for operating wireless water meter 35 and handling communications with network operations center 50 (not shown in FIG. 2). For example, electronic systems module 150 may issue instructions to or receive data from battery system 100 (e.g., providing power safety), calibration system 105, meter shut-off system 110, and wireless communications module 130, among other components. The firmware-based programs may include conventional firmware available from Intel Corporation of Santa Clara, Calif., Microsoft Corporation of Redmond, Wash., IBM Corporation of Armonk, N.Y., or Sun Microsystems, Inc. of Santa Clara, Calif., for example, and may be programmed to implement the present invention using conventional programming techniques.

Wireless water meter 35 may include one or more sensors to determine selected properties of the water and help determine water flow volume and water usage. For example, wireless water meter 35 may include temperature and pressure sensor 140. One suitable example of temperature and pressure sensor 140 is the AST-4000 sensor manufactured by American Sensor Technologies, Inc. of Mt. Olive, N.J.

Calibration system 105 allows system 10 (not shown in FIG. 2) to calibrate wireless water meter 35 either remotely, e.g., via wireless network 70 from network operations center 50 or mobile field technician 75, or automatically, e.g., self-calibrate via electronic systems module 150. Calibration system 105 may include or interact with meter shut-off system 110, flow volume measurement system 115, wireless communications module 130, and electronic systems module 150, for example, to calibrate wireless water meter 35. For instance, network operations center 50 may place wireless water meter 35 in calibrate mode to initiate the calibration process.

Upon initiating calibrate mode, network operations center 50 instructs water meter 35 to shut off water to client 45 (not shown in FIG. 2), e.g., closing client port 190. As discussed above, water meter 35 may include a high-powered battery system 100, generator 180, and solenoid 205 to provide for efficient and substantially self-powered water shut-off. Once the water is shut off, network operations center 50 may read meter 35, e.g., retrieve data from display 145 or electronic system module 150, to provide network operations center 50 with a bench mark. Network operations center 50 may then test the water system temperature and pressure using temperature and pressure sensor 140. Network operations center 50 activates solenoid 205 to open calibration port 185 for a selected amount of time. Network operations center 50 reads meter 35 after the calibration test is complete, closes calibration port 185 and reopens client port 190. The information, e.g., starting meter reading, volume, temperature, pressure, total time and ending meter reading, is collected and processed by network operations center 50. Network operations center 50 may then reset water flow measurement system 115 as necessary to provide correct measurement in accordance with the results of the calibration test.

For example, water flow measurement system 115 determines water usage based on the number of revolutions of paddle wheel 125 within water chamber 220 as measured by optic sensor 120. During the calibration process, network operations center 50 or electronic system module 150 measures the number of turns for a given flow volume against a lab calibrated value. Accordingly, network operations center 50 may reset optic sensor 120 based on the new number of revolutions on paddle wheel 125.

Alternatively, or in addition, calibration system 105 may allow wireless water meter 35 to be self-calibrating. For example, electronic system module 150 may issue instructions to calibration system 105 to perform the calibration test in accordance with a selected schedule or in response to certain events or apparent water usage behavior. Calibration system 105 may then send the data to electronic systems module 150 for processing. If necessary, electronic systems module 150 may adjust water flow measurement system 115 to correct for any loss in calibration, e.g., reset optic sensor 120. A log or record of the calibration results may then be automatically transmitted to network operations center 50 for storage, analysis or review.

Figure 3:
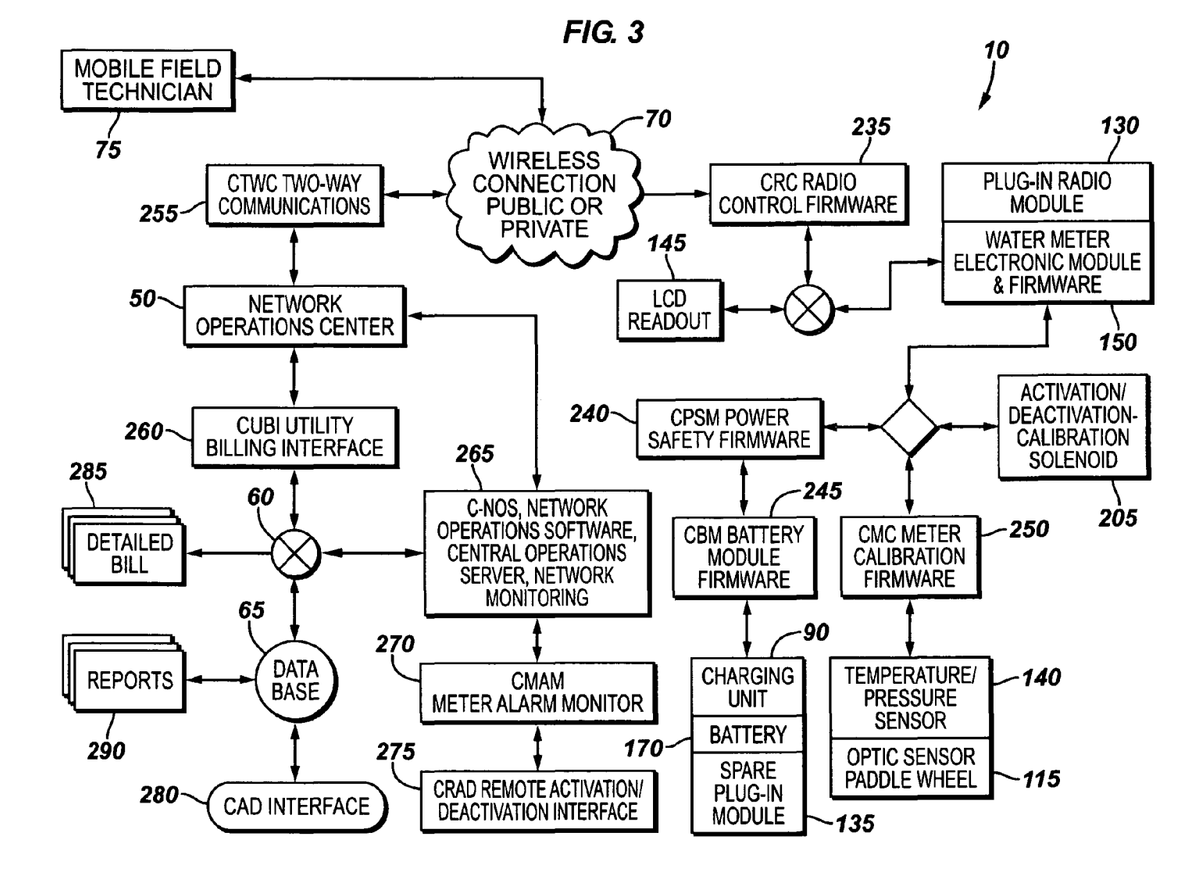
FIG. 3 is a flow chart of an embodiment of the software interaction between the system and meter shown in FIGS. 1 and 2.

FIG. 3. is a flow chart illustrating an embodiment of the interaction of software components for the embodiments of system 10 and wireless water meter 35 shown in FIGS. 1 and 2. Network operations center 50 includes network operations software 265 to provide a user with real-time network access to wireless water meters 35, allow delivery of network billing commands, provide scalable billing structure for conservation conditions, peak water usage conditions and local ordinances, and provide calibration controls and standard on/off operations, among other possible functions and operations. Network operations software 265 may reside on server 60 and/or other computer systems in system 10. Network operations software 265 includes, or communicates with, two-way communications software 255, utility billing interface software 260, meter alert monitor software 270, remote activation/deactivation interface software 275 and CAD interface software 280.

CAD interface software 280 allows a user to access database 65 and use the stored usage data for the purposes of system modeling, analysis and design, for example. Two-way communications software 255 interacts with communications control software 235 to provide two-way communication between network operations software 265 and wireless water meter 35. For example, network operations software 265 may send specified commands to one or more meters 35. Once the selected meters 35 have responded and completed the commands, the selected meters 35 may verify their status with a response.

Utility billing interface 260 may interface with selected conventional billing software platforms and provide billing information such as water usage, reading date, cost per gallon, time and date of water use, multiple billing rates by time of usage, date of usage, and amount of usage or overages, among other information. This information may be stored to or retrieved from database 65 and output as detailed utility bills 285 or reports 290.

Meter alert monitor 270 monitors usage characteristics for each meter 35 connected to wireless network 70 to establish a standard pattern of usage for each meter 35 for each season. Once a standard pattern has been established, network operations software 265 monitors the current usage patterns of a selected meter 35 and compares the current usage patterns against the associated standard pattern of usage. By comparing the patterns, network operations software may detect any major changes which may be attributed to tampering, leakage, broken pipes, low pressure and backflow, among other problems. Upon detecting a potential problem, an alert may be issued to a user via network operations center 50. Accordingly, meter alert monitor 270 may prevent or minimize substantial losses to both the utility company and client. Meter alert monitor 270 may also allow network operations center 50 to monitor mainline distribution for volume purchased and volume sold to facilitate the system audit process.

Remote activation/deactivation software 275 may poll the utility company's billing system, e.g., via utility billing interface 260, for delinquent accounts and notify network operations center 50 or the user to initiate remote deactivation and/or reactivation of any selected meter 35. Network operations software 265 may receive new customer activation requests and accordingly test, calibrate and activate the meter via remote activation/deactivation software 275. During ration or conservation periods, network operations software 265 and activation/deactivation software 275 may monitor water usage per meter 35 by selected day or hour for violations of local ordinances and automatically send a violation charge to the billing system along with data confirming the violation and/or initiate water shut-off to prevent violations. During emergency situations or in response to critical conditions such as loss of pressure, backflow issues, or water pump failure, network operations software 265 and activation/deactivation software 275 may respond quickly and deactivate meters 35 one by one, grid by grid, or even the entire system, and reactivate the system as needed without requiring the dispatch of field technicians or personnel.

As discussed above, water meter 35 may include firmware-based software resident on electronic systems module 150 to communicate, control aspects of wireless water meter 35 or collect data. As shown in FIG. 3, the firmware-based software may include communications control firmware 235, power safety monitor firmware 240, battery module firmware 245, and meter calibration firmware 250.

Communications control firmware 235 may be programmed for the selected wireless communication module 130 to manage reception and transmission of data across wireless network 70. The programmability of radio control firmware 235 allows a user to use the same base hardware and utilize different networks or radio modules in different areas as needed. Battery module firmware 245 monitors the status of battery system 100 and charging system 90 to determine the power levels of batteries 170. Battery module firmware 245 may interact with power safety monitor firmware 240 to manage power for wireless water meter 35.

Power safety monitor firmware 240 monitors power consumption and power generation to maintain a safe battery level for normal onboard operation requirements. Power safety monitor firmware 240 allows wireless water meter 35 to operate and store required data during low power generation cycles and refrain from broadcasting on wireless network 70 to conserve power. Power safety monitor firmware 240 may also monitor command requests from network operation software 265 and permit a broadcast on wireless network 70 during low battery periods only in emergency operations. Power safety monitor firmware 240 may update network operation software 265 on a selected schedule, e.g., weekly, and alert network operation software 265 when any status condition is out of the normal range, e.g., battery power, generator performance, and system pressure, among other examples.

Meter calibration firmware 250 interacts with calibration system 105 to manage the self-calibration or remote calibration of wireless water meter 35. A user of network operations center 50 may remotely activate meter calibration firmware 250 from network operations software 265. Once activated, meter calibration firmware 250 may run a calibration test. For example, meter calibration firmware 250 may interact with other system components to shut water off to client 45, test and store the system pressure data, register the output of optic sensor 120 via display 145, open calibration port 185 and, after a selected time, close calibration port 185. Once calibration port 185 is closed, meter calibration firmware 250 may re-test the system pressure and register the new readout from display 145. Meter calibration firmware 250 may calculate any changes from calibration port 185, readjust the readout for display 145 and transmit the results to central operations software 265.

The present invention provides a number of advantages and benefits over conventional utility meters. The wireless water meter of the present invention is operable to provide two-way communication over a wireless network to provide substantially real-time access to usage data, allow remote control and monitoring of the meter, and provide communications over a relatively large distance. The wireless water meter may also provide and maintain enough power to allow for substantially real-time access and control, rather than sporadic or periodic activity. The present invention may also provide automated or remote calibration (and enough power to do so fairly regularly) to avoid significant losses of revenue. Moreover, the present invention may allow a utility company to recognize potential emergencies through monitoring and respond to such emergencies over the wireless network and without the need to dispatch a single field technician. In addition, the present invention may facilitate automated and remote billing practices.

Because the wireless water meter may utilize plug-in wireless communications cards, the present invention may be implemented in an existing legacy environment. As a result, a user may keep the existing legacy technology in place while implementing the present invention as the water utility distribution system expands. In addition, the components of the wireless water meter of the present invention are substantially modular, allowing a user to replace or upgrade components quickly and easily, and without removing the entire meter. Other benefits will be apparent to one of ordinary skill in the relevant arts.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

What is claimed is:

1. A meter that monitors usage of a water distribution system by a client, comprising:
    a wireless communications system operable to communicatively couple the meter to a wireless network to provide two-way communication between the meter and the wireless network;
    a flow measurement system operable to measure a volume of water flow through the meter, wherein measurement data indicating the volume is transmitted to the wireless communications system;
    a calibration system operable to calibrate the flow measurement system of the meter, wherein the calibration system calibrate the meter in response to an instruction received via the wireless network;
    a charging system operable to charge a battery, wherein the charging system utilizes the water flow through the meter to generate power; and
    a power system operable to maintain a sufficient level of power for the meter to allow real-time communication between the meter and the wireless network.

2. The meter of claim 1, wherein the meter is self-powered.

3. The meter of claim 2, further comprising a meter shut-off system comprising a valve, wherein the meter shut-off system is operable to open the valve to permit water distribution to the client and close the valve to prevent water distribution to the client, wherein the meter shut-off system is operable to open or close the valve in response to an instruction received via the wireless network.

4. The meter of claim 3, wherein the meter is operable to send and receive data via a cellular, Wi-Fi, Wi-Max, 400 MHz, 900 MHz or proprietary radio network protocol.

5. The meter of claim 4, wherein the power system comprises a rechargeable battery system.

6. The meter of claim 5, wherein the meter is self-calibrating.

7. The meter of claim 6, wherein the meter is operable to monitor the power system and transmit a communication concerning the status of the power system via the wireless network.

8. A system for managing client water usage comprising:
    a network operations center comprising
        a server,
        a database, and
        a wireless communications transmitter and receiver operable to communicatively couple the network operations center to a wireless network; and
    a water meter operable to monitor the client water usage, wherein the water meter comprises,
        a battery powering the meter, wherein the battery is charged utilizing power generated by water flow through the meter,
        a flow measurement system operable to measure a volume of water flow through the meter, and
        a calibration system operable to calibrate the flow measurement system of the meter, wherein the calibration system calibrates the meter in response to an instruction received via the wireless network,
        wherein the meter is communicatively coupled to the wireless network and operable to provide two-way communication with the network operations center, and wherein the meter is operable to transmit data concerning the client water usage to the network operations center.

9. The system of claim 8, wherein the network operations system is operable to remotely calibrate the meter.

10. The system of claim 9, wherein the network operation system is operable to instruct the meter to permit water distribution to the client or prevent water distribution to the client.

11. The system of claim 10, wherein the network operation system is operable to store billing information associated with the client, wherein the billing information is based on the data concerning the client water usage.

12. The system of claim 11, wherein the network operation system is operable to determine a range of normal water usage and operable to instruct the meter to prevent water distribution to the client if client water usage exceeds the range of normal water usage by a selected amount.

13. The system of claim 12, wherein the network operation system is operable to remotely activate an account associated with the client.

14. A method for remotely managing client water usage in connection with a water distribution system, wherein the client is located within a service region, comprising the steps of:
    providing a wireless water meter communicatively coupled to a wireless network to provided two way communication and operable to monitor client water usage, wherein the meter provides a flow measurement system for monitoring water usage;

calibrating the flow measurement system with a calibration system integrated with the wireless water meter, wherein the calibration system calibrates the meter in response to an instruction received via the wireless network;

powering the meter with a battery, wherein the battery is charged utilizing power generated by water flow through the meter;

transmitting a request to the meter for data concerning the client water usage via the wireless network; and receiving data concerning the client water usage of the client via the wireless network.

15. The method of claim 14, further comprising the steps of:

establishing a standard usage pattern for the service region, and determining if the client water usage deviates from the standard usage pattern by a selected amount.

16. The method of claim 15, further comprising the step of remotely calibrating the meter.

17. The method of claim 16, further comprising the steps of:

determining whether the client has a delinquent account; and instructing the meter to limit client water usage if the client has a delinquent account.

18. The method of claim 17, further comprising the steps of:

determining whether the client has committed a violation of an ordinance concerning water usage; and billing the client for a violation charge if the client violated the ordinance.

19. The method of claim 18, further comprising the steps of determining a time of client water usage; and billing the client according to a billing rate associated with the time of client water usage.

20. The method of claim 19, further comprising the steps of:

receiving an emergency notification concerning service area or the water distribution system; and instructing the meter to limit client water usage.

21. The system of claim 9, wherein the network operation system calibrates the meter utilizing data gathered during a calibration test, the data gathered is a starting meter reading, volume, temperature, pressure, total time, or ending meter reading.

22. The method of claim 16, further comprising the steps of:

gathering data during a calibration test, wherein the data is a starting meter reading, volume, temperature, pressure, total time, or ending meter reading; and recalibrating the meter in accordance with the results of the calibration test.

* * * * *